United States Patent [19]
Brown et al.

[11] Patent Number: 6,069,945
[45] Date of Patent: May 30, 2000

[54] GLOBAL SUBSCRIBER NUMBERING TRANSLATION SYSTEM FOR CONTROLLING INTERNATIONAL CALL ROUTING

[75] Inventors: John Carl Brown, Matawan; Fen-Chung Kung, Bridgewater; Vinay M. Singh, Jersey City; Cherry Tom, Morristown, all of N.J.

[73] Assignee: AT+T Corp, New York, N.Y.

[21] Appl. No.: 08/914,845

[22] Filed: Aug. 18, 1997

[51] Int. Cl.[7] .............................. H04M 7/00; H04M 15/06
[52] U.S. Cl. ........................... 379/220; 379/127; 379/230
[58] Field of Search ..................................... 379/220, 207, 379/127, 221, 122, 230

[56] References Cited

U.S. PATENT DOCUMENTS

| | | | |
|---|---|---|---|
| 4,555,594 | 11/1985 | Friedes et al. | |
| 5,406,620 | 4/1995 | Pei | 379/220 |
| 5,764,749 | 6/1998 | Zelazny et al. | 379/220 |
| 5,903,638 | 5/1999 | Welter, Jr. et al. | 379/220 |

*Primary Examiner*—Harry S. Hong
*Attorney, Agent, or Firm*—A. G. Steinmetz

[57] ABSTRACT

A called number processing system transforms called/dialed telephone numbers into a unique global routing number. In the process called numbers are analyzed and based on the called/dialed number a Regional Administration Code is allocated and the dialed global number is translated into a global subscriber number. The global subscriber number is translated into a local subscriber number at the last international processing point.

6 Claims, 2 Drawing Sheets

GLOBAL SUBSCRIBER NUMBERING TRANSLATION SYSTEM FOR CONTROLLING INTERNATIONAL CALL ROUTING

FIELD OF THE INVENTION

This invention relates to subscriber telephone numbers and in particular to the transformation of subscriber dialed numbers into global routing telephone numbers for facilitating international calls and controlling routing through a selected telephone network.

BACKGROUND OF THE INVENTION

In present local telephone systems a subscriber initiates a call by dialing a number, into a subscriber calling station telephone set. That number defines the call's destination and also may determine the routing of the call to its intended destination. In the instance of a local call, in the U.S., with a destination occurring within the local service area of the calling station, the caller dials a seven digit number which is known or readily available. In the instance of international calls the subscriber dials a long multi-digit number which provides an international access code, a country code, an area code of the country and the local exchange and subscriber number. In both instances the called number allows the switched communication system to direct the call to its intended recipient. This direction does not determine the precise routing points used and encountered by processing the call.

Routing of these calls is dependent upon present traffic and preset switching conventions set by various communication/telephone companies in different countries. Routing is generally handled by a consortium of telephone companies internationally and the routing is independent of any one telephone company. With new services availability and the customer choice it offers, it is desirable to allow one telephone company to control routing of international calls. By controlling routing a single company may use its own network to a larger extent and have control of quality and the form of service. It is further desirable to allow control over transmission processing points in the routing of an international call.

SUMMARY OF THE INVENTION

A called number processing system transforms called/dialed international telephone numbers into a unique global routing number. In the process called international global numbers (GN) are analyzed and based on the called/dialed number a Regional Administration Code (RAC) is allocated and the dialed global number GN is translated into a global subscriber number (GSN). The global subscriber number GSN is translated into a local subscriber number (LSN) at the last processing point prior to the destination.

The RAC, appended to the GSN, defines a local switch address (LSA) and a destination switch address (DSA). The RAC is an administrative code for providing a unifying telephone number when appended to the start of a conventional international calling number to identify termination addressees in a way permitting the originating telephone system to retain the call processing within its own network and to identify the termination in such a way to permit this advantage.

DETAILED DESCRIPTION

Figure 1:
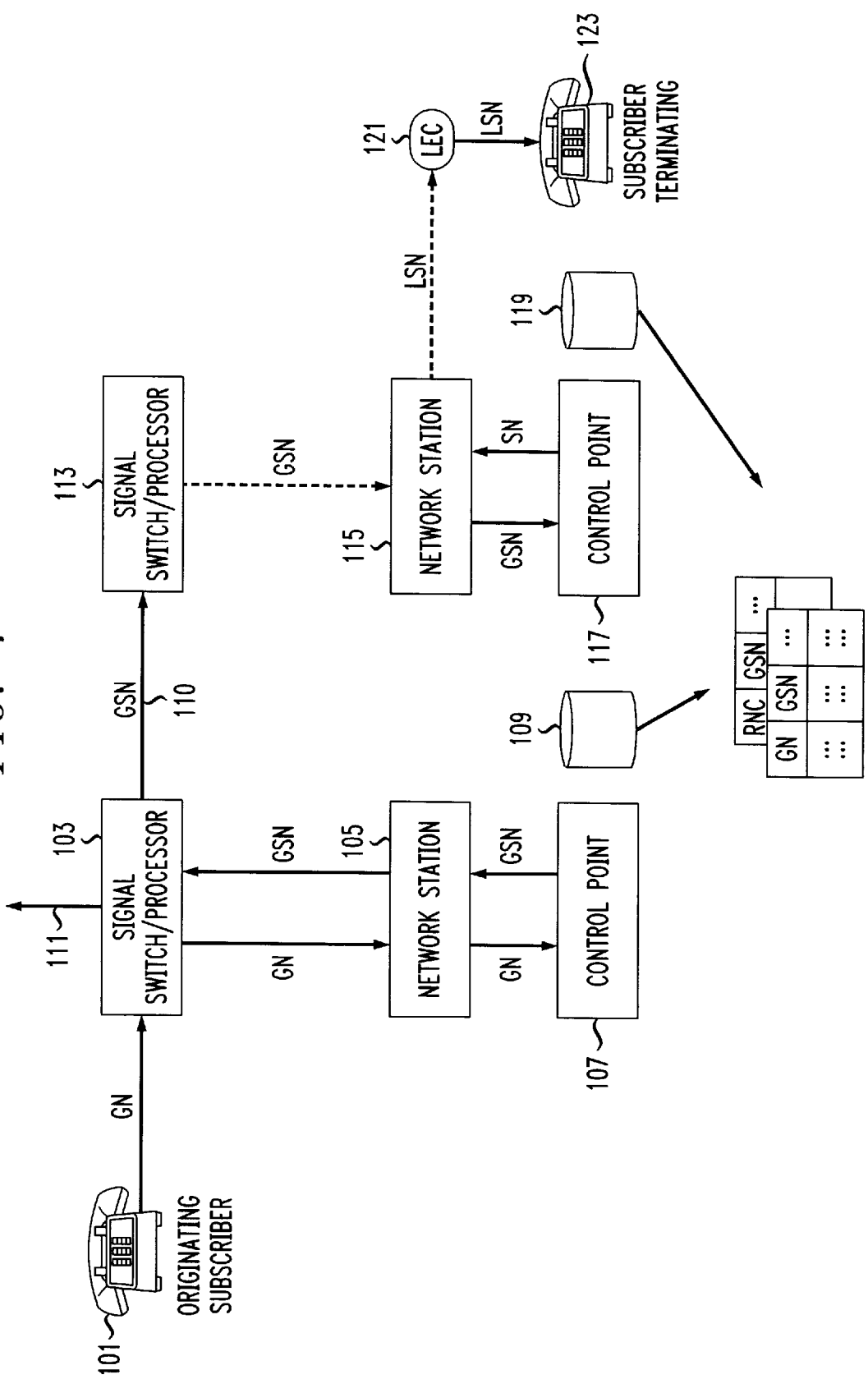
FIG. 1 is a schematic of a global telephone system to which the RAC process may be applied.

An international telephone network must provide the capability to allow callers from one nation to call recipients in another nation. The telephone network system such as shown in FIG. 1 permits recognition of a calling subscriber number and translation of the called number to a generic global number for completing a call to the desired termination subscriber over a desired network normally that serving the subscriber domestically. The network includes control points and data bases which permit translation of a called number to a universal global number.

A call is initiated by an originating subscriber 101 who dials a global telephone number (GN) of a conventional nature with a country code plus a area code plus an exchange code followed by the subscriber number. Such a number typically has the form 01 44 171 765 4321. The digits of the number guide the call connections through local regional and international switches The 44 identifies a country, 171 an area code of that country, 765 a local exchange and 4321 a subscriber number. This global number is received by the switch or signal processor 103 which normally recognizes the international number and signals the proper routing to its next destination. The switch 103 is conventional but includes software to detect a number from a specific originating source telephone company In the instance of the specific originating source the traditional global number received is transmitted to the network station 105. Network station 105 is typically a logical network station normally used for interconnecting two networks, devices or nodes that may have incompatibility between them The network station may perform protocol conversions across communication functions or layers. Network station 105, in the present application intelligently connects to the control point 107 to access RAC numbers corresponding to the dialed international number country code and area code and office code in a data base.

The switch 103 transmits the received global number to a network station 105 which interacts with a control point server 107 to obtain from an associated data base 109 to retrieve from storage a Regional Access Code (RAC). The originally dialed number code, including country, area and exchange codes, is mapped onto the associated RAC code from the GN number (four digits) located in storage medium 109.

The RAC code is appended to the global number GN forming a GSN number, which is returned to the switch 103 which transmits the number plus the appended RAC code to the local switch 113 located at the receiving country to which the call is directed. The RAC guides the call through the international network, as desired by the controlling telephone company, as shown in the FIG. 1 by the arrow 110 connecting switch 103 to international destination switch 113 all under the direction of the RAC number. Traditional calls without an RAC number are directed, via a path as defined by the arrow 111, to a public consortium network.

The received RAC number with global number GSN is transmitted by switch 113 to the associated control point server 117 which queries its associated data base 119 to retrieve the local subscriber number (LSN) related to the transmitted number containing the RAC.

The local network station completes the call through the local exchange carrier (LEC) 121 to the subscriber termination 123.

A illustrative routing number scheme defining RAC numbers is shown in the following table. As shown a RAC number may be defined by a local switch address (LSA) and a destination switch address (DSA).

Number Definition Table

| RAC  | LSA | Location       | DSA | Location        |
|------|-----|----------------|-----|-----------------|
| 0112 | 01  | Asia/India     | 12  | Tokyo area      |
| 0121 | 01  | Asia/India     | 21  | Taipei area     |
| 0328 | 04  | Europe         | 28  | London area     |
| 0428 | 04  | Europe         | 28  | Paris area      |
| 0815 | 08  | America        | 15  | New Jersey area |
| 1132 | 11  | Asia/Australia | 32  | Sydney area     |

The effective translation, from dialed number to RAC, is exemplified as shown in the following table.

Translation

| GSN      | RAC  |
|----------|------|
| 44171765 | 0328 |
| 1201386  | 0815 |

Figure 2:
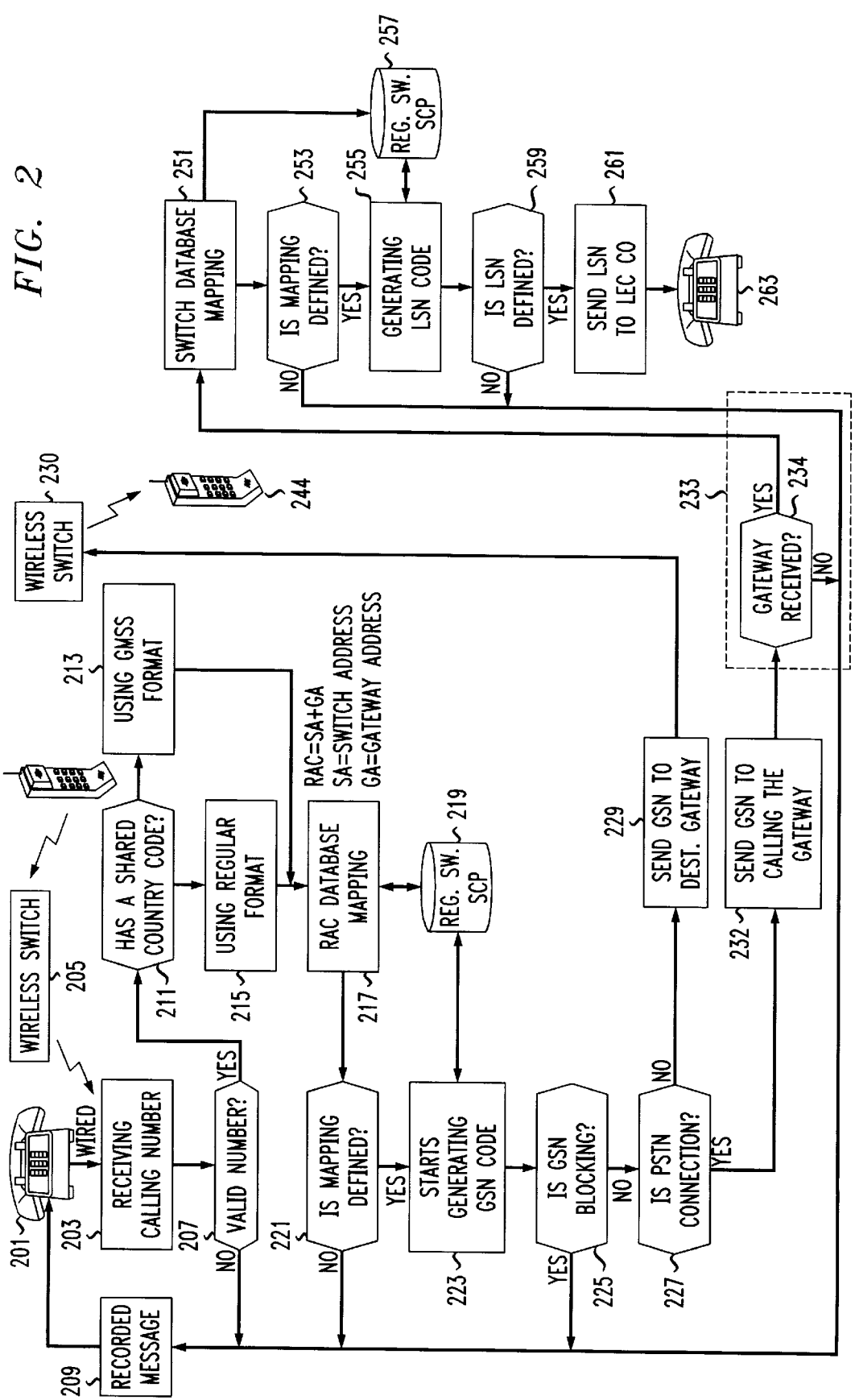
FIG. 2 is a flow chart illustrating the RAC process.

As shown by the tables each dialed telephone number GN is mapped onto a unique global RAC routing number. The system number translation process is illustrated by the flow chart of FIG. 2. At initiation of the process a subscriber dials an international number, at a subscriber terminal, as shown at 201. This dialed number is forwarded to a wired receiver as per 201 or for another subscriber, via wireless, to switch 205 and thence to processor 203 receiving the dialed number. The next step provided by decision box 207 queries the validity of the number (i.e., one that can be readily processed). If the number is not valid the next step is by box 209 which returns a recorded message to the subscriber that the number can not be processed. If the number is valid the following decision step (box 211) determines if the dialed number has a shared country code. If that code is in a GMSS (Global Mobile Satellite System) format as per step 213 the flow proceeds to the RAC date base mapping in step 217. If it has a regular format (i.e.,Wired Network) the flow proceeds to box 215 and then via box 215 to the RAC data base mapping in step 217 The RAC database mapping step is connected to a data base control point 219 containing stored data relating RACs to GNs and to a decision step 221 for determining if mapping of RACs to GNs is defined to generate the RAC and append it to the dialed GN. Data for the mapping is secured from the data base 219. If the data base mapping is defined the flow proceeds to step 223 which operates to generate a GSN code using the stored data of database 219 If mapping is not defined the subscriber receives a recorded message as per step 209. If code is being generated, step 221 a determination is performed by step 223 to see if GSN is blocking.

Step 225 determines if a connection to a land PSTN (Public Switched Telephone Network) has been made. If not the flow proceeds by sending the GSN, via block 229, to a destination wireless switch 230. The call may then proceed directory to a termination subscriber 244. If the connection to a PSTN is made the GSN is sent to a land gateway 233. Land gateway 233 includes a decision 234 which responds to receipt of a GSN from block 232.

The call process to a switch box 251 providing data base mapping. A decision is performed in block 253 to determine if mapping is defined for RAC to GSN. With the mapping defined the LSN code can be generated as per block 255 in coordination with the data base of storage device 257. If not flow returns to deliver a recorded message of no completion of the call as per box 209. Determination of whether the LSN is defined is determined as per decision block 259 (i.e., corresponds to an existing number). If the number is not defined the flow returns to the recorded message (box 209). If the LSN is defined the flow proceeds to the box 261 which forwards the LSN to the LEC co (box 263) which results in the connection to the terminating subscriber set 267.

As is apparent from the forgoing description an RAC is appended to a dialed GN for the purpose of redirecting the dialed call through the subscribers telephone company in distinction to that of the normal consortium connection. This provides control over the routing and quality of the call and related services.

Definitions of Terms:

GN:
  An international telephone number dialed by an originating subscriber.
GSN:
  An attenuated Global number (.i.e, international identifier, area code, and local office code) which includes an appended RAC.
RAC:
  A regional administrative code appended to a GSN and which defines a destination switch address and a local switch address.
DSA:
  Destination Switch Address, recipient of a dialed country code.
LSA:
  Local Switch Address, a local switch exchange connected to the terminating subscriber.

What is claimed is:

1. An international called number processing method, for controlling international call network routing comprising:
   maintaining a database for mapping an international called number onto a regional administrative code; including;
      generating from the database a global switch address number which has appended to it the regional administrative code for defining a path from a local switch address to a destination switch address, with the path being a single defined network path of a specific provision company; and
      generating the regional administrative code by concatenation of the destination switch address number and the local switch address number.

2. The method of claim 1, further comprising:
   specifying the regional administrative code to include a destination switch address and a local switch address.

3. The method of claim 1, further comprising:
   extracting country, area and exchange numbers from a global number to specify a regional administrative code.

4. A method of mapping a dialed global number onto a regional administrative code for the purpose of controlling routing of the call through a selected network path, comprising the steps of:
   appending the regional administrative code to the dialed global number; and controlling a destination switch of a country and a local switch of a terminating subscriber in accord with the regional administrative code to direct call routing through a specific network; and generating the regional administrative code by concatenation of the destination switch address number and the local switch address number.

5. The method of claim 4, further including:

specifying the regional administrative code to include a destination switch address and a local switch address.

6. The method of claim 4, further including:

extracting country, area and exchange numbers from a global number to specify a regional administrative code.

* * * * *